US012760708B2

(12) United States Patent
Rai et al.

(10) Patent No.: US 12,760,708 B2
(45) Date of Patent: Oct. 13, 2026

(54) WIND TURBINE MOUNTING KITS FOR TELECOMMUNICATION STRUCTURES AND RELATED ASSEMBLIES

(71) Applicant: OUTDOOR WIRELESS NETWORKS LLC, Richardson, TX (US)

(72) Inventors: Dipen Rai, Sunbury On Thames (GB); Steven M. Clark, Dalgety Bay (GB); Lokeshwaran Maruthanayagam Sundar, Scarborough (GB); Steven Lock, York (GB)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 0 days.

(21) Appl. No.: 19/149,586

(22) PCT Filed: Jan. 22, 2024

(86) PCT No.: PCT/US2024/012309
§ 371 (c)(1),
(2) Date: Jul. 21, 2025

(87) PCT Pub. No.: WO2024/167652
PCT Pub. Date: Aug. 15, 2024

(65) Prior Publication Data

US 2026/0117743 A1 Apr. 30, 2026

Related U.S. Application Data

(60) Provisional application No. 63/490,271, filed on Mar. 15, 2023, provisional application No. 63/483,335, filed on Feb. 6, 2023.

(51) Int. Cl.
*H01Q 1/12* (2006.01)
*F03D 3/00* (2006.01)
*F03D 9/43* (2016.01)

(52) U.S. Cl.
CPC ............... *F03D 9/43* (2016.05); *F03D 3/009* (2023.08); *H01Q 1/1242* (2013.01); *F05B 2240/213* (2013.01); *F05B 2240/9121* (2013.01)

(58) Field of Classification Search
CPC .......... H01Q 1/1242; E04H 12/08; F03D 3/02
See application file for complete search history.

(56) References Cited

U.S. PATENT DOCUMENTS

2004/0232703 A1 11/2004 Michael
2009/0224554 A1 9/2009 Flynn
(Continued)

OTHER PUBLICATIONS

International Search Report and Written Opinion corresponding to PCT/US2024/012309; Mailed: May 1, 2024, (11 pp).

*Primary Examiner* — Awat M Salih
(74) *Attorney, Agent, or Firm* — Myers Bigel, P.A.

(57) ABSTRACT

The present application is directed to an antenna assembly. The antenna assembly includes a telecommunications structure; a plurality of antennas mounted to the telecommunications structure; and a plurality of wind turbines mounted to the telecommunications structure by a mounting kit, the plurality of wind turbines positioned a distance below the plurality of antennas. Mounting kits for mounting wind turbines to a telecommunications structure are also described herein.

20 Claims, 13 Drawing Sheets

(56) References Cited

U.S. PATENT DOCUMENTS

| | | | | |
|---|---|---|---|---|
| 2011/0006540 | A1* | 1/2011 | Ignatiev | F03D 9/25 290/55 |
| 2011/0148116 | A1 | 6/2011 | Halstead | |
| 2011/0177844 | A1 | 7/2011 | Lowas | |
| 2013/0272875 | A1 | 10/2013 | Sieber et al. | |
| 2020/0348330 | A1* | 11/2020 | Bush | G01P 5/06 |
| 2021/0336331 | A1* | 10/2021 | Rai | H01Q 1/02 |

* cited by examiner

WIND TURBINE MOUNTING KITS FOR TELECOMMUNICATION STRUCTURES AND RELATED ASSEMBLIES

RELATED APPLICATION(S)

The present application is a 35 U.S.C. § 371 national phase application of International Application No. PCT/US2024/012309, filed Jan. 22, 2024, which claims priority from and the benefit of U.S. Provisional Patent Application Ser. No. 63/483,335, filed Feb. 6, 2023, and U.S. Provisional Patent Application Ser. No. 63,490,271, filed Mar. 15, 2023, the disclosures of which are hereby incorporated herein in their entireties.

FIELD

The present invention is directed generally to telecommunications assemblies, and in particular, to kits for mounting one or more wind turbines to a telecommunications structure and related assemblies.

BACKGROUND

Wind energy is one of the popular renewable and sustainable energy sources, which generates power using mostly the wind turbines. Wind power is more eco-friendly, has less impact on the environment compared to fossil fuels and helps in saving energy for the future generations. Utilizing wind energy in different environments could significantly reduce energy costs, reduce environmental impacts and improve planning applications.

SUMMARY

A first aspect of the present invention is directed to an antenna assembly. The antenna assembly includes a telecommunications structure; a plurality of antennas mounted to the telecommunications structure; and a plurality of wind turbines mounted to the telecommunications structure by a mounting kit, the plurality of wind turbines positioned a distance below the plurality of antennas.

Another aspect of the present invention is directed to an antenna assembly. The antenna assembly includes a telecommunications structure; one or more equipment cabinets; a plurality of antennas mounted to the telecommunications structure, the plurality of antennas including one or more passive antennas and one or more active antennas; and three wind turbines mounted to the telecommunications structure 120 degrees apart from each other by a mounting kit, the three wind turbines positioned on the telecommunications structure a distance below the plurality of antennas.

Another aspect of the present invention is directed to an antenna assembly. The antenna assembly includes a monopole; a plurality of antennas mounted to the monopole; and three wind turbines mounted to the monopole a distance below the plurality of antennas by a mounting kit. The mounting kit includes a bracket system having a pair of ring mounts and a pair of offset members for each of the wind turbines, each pair of offset members extending outwardly from the ring mounts and configured to have a respective wind turbine secured thereto.

Another aspect of the present invention is directed to an antenna assembly. The antenna assembly includes a lattice antenna tower, a plurality of antennas mounted to the lattice antenna tower, and one or more wind turbines mounted to the lattice antenna tower a distance below the plurality of antennas by a mounting kit. The mounting kit includes one or more bracket systems. Each bracket system includes an upper clamping assembly, a lower clamping assembly, an offset member coupled to and extending outwardly from the upper clamping assembly, a brace member coupled to an extending outwardly from the lower clamping assembly, and a mount plate coupled the offset member and configured to have a respective wind turbine mounted and secured thereto.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim, accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
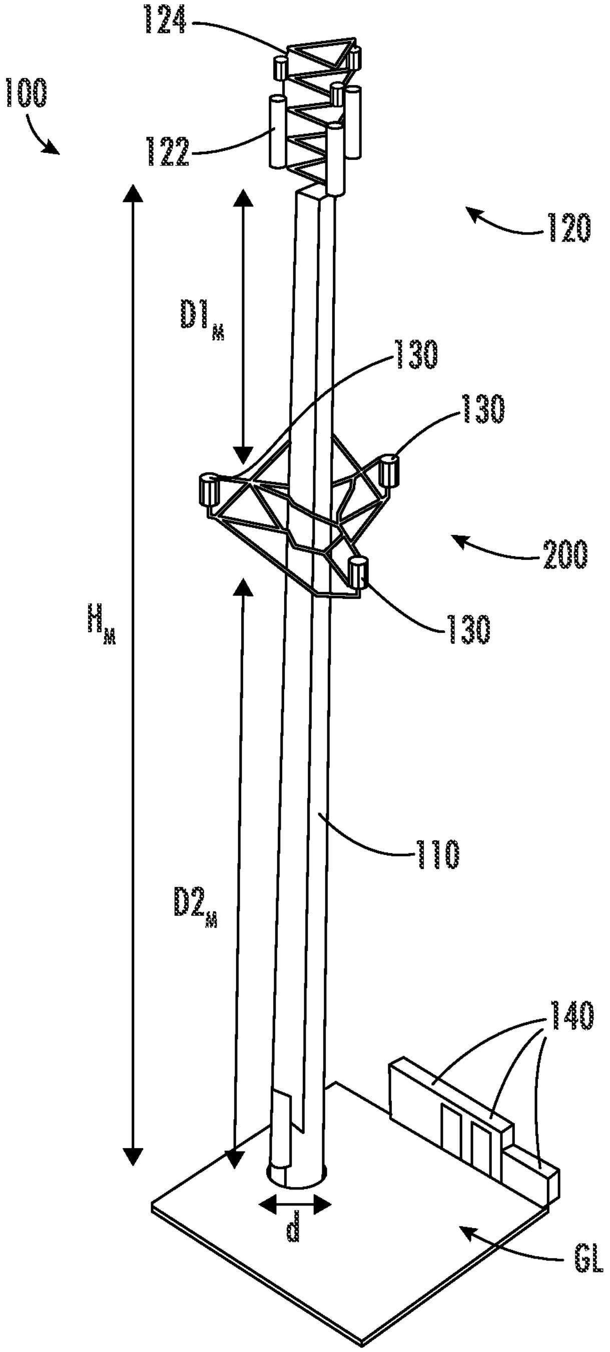
FIG. 1 is a perspective view of an antenna assembly having wind turbines mounted thereon according to embodiments of the present invention.

The present invention is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components, or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Embodiments of the present invention are directed to a mounting kit for wind turbines for telecommunication structures such as monopoles and lattice antenna towers, including kits that may be retrofitted on an existing telecommunications structure. In some embodiments, the mounting kit utilizes multiple smaller wind turbines (which may be off the shelf product) on sites with a telecommunications structure in groups of three to generate significant electrical power (e.g., one-third to full power requirements of the monopole, depending on the antenna site design). In some embodiments, the mounting kit is installed at a height below the antenna and away from the antenna line of sight and radio frequency (RF) zones. The present invention may provide multiple advantages such as easy maintenance of the antennas and wind turbines, having less effect of loadings on the telecommunications structure (e.g., less stress and fatigue), and the turbines being rated for a low noise rating. In some embodiments, the three wind turbines have 120 degrees of separation, such that at any given wind direction, two turbines may always be exposed to head wind, while the third turbine would still be able to produce energy. The present invention provides a solution that balances wind speed with other telecommunications requirements which are normally not found within the wind turbine sector. Embodiments of the present invention will now be described in further detail below with reference to FIGS. 1-9C.

Referring to FIG. 1, an antenna assembly 100 according to embodiments of the present invention is illustrated. As shown in FIG. 1, the antenna assembly 100 includes a telecommunications structure 110, a plurality of antennas 120, a plurality of wind turbines 130, and one or more equipment cabinets 140. In some embodiments, the telecommunications structure 110 may be a monopole (see, e.g., FIG. 1, FIGS. 2A-2B, FIG. 5, and FIGS. 6A-6B). In other embodiments, the telecommunications structure 110 may be a lattice antenna tower (see, e.g., FIGS. 7A-9C). In some embodiments, the plurality of antennas 120 may include one or more passive antennas 122 and/or one or more active antennas 124. In some embodiments, the one or more equipment cabinets 140 may include a cabinet for radios, a cabinet for electrical grid equipment, and a cabinet for wind turbine unit equipment.

Figure 2A:
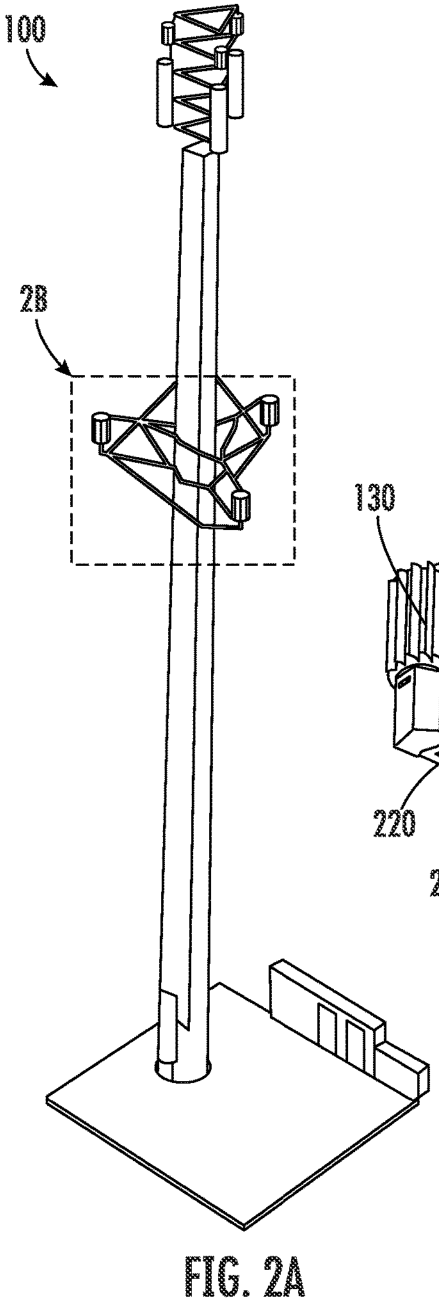
FIG. 2A is a perspective view of the antenna assembly of FIG. 1.
Figure 2B:
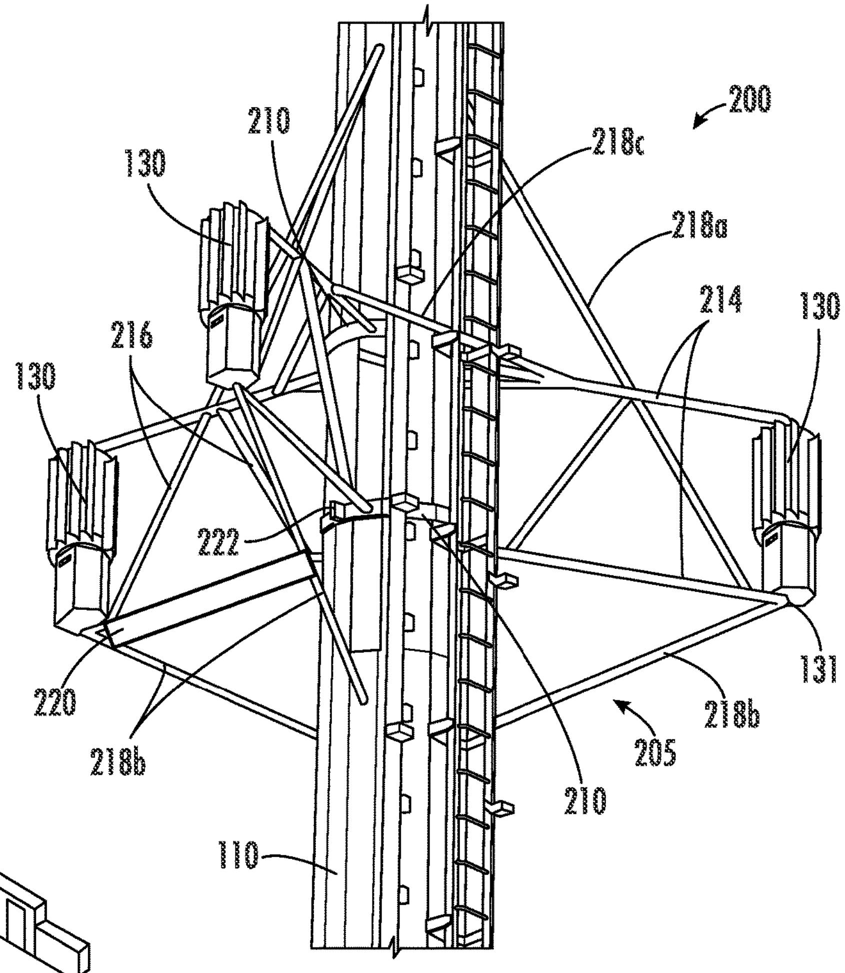
FIG. 2B is an enlarged bottom perspective view of an exemplary mounting kit for one or more wind turbines that may be used with the antenna assembly of FIG. 1 according to embodiments of the present invention.

The telecommunications structure 110 (e.g., monopole as shown in FIG. 1 and FIGS. 2A-2B) has a height ($H_M$) and a diameter (d). In some embodiments, the telecommunications structure 110 has a height ($H_M$) in a range of between about 15 meters to about 35 meters. In some embodiments, for example, when the telecommunications structure 110 is a monopole, the telecommunications structure 110 may have a mast height of about 30 meters and a headframe height of about 3.3 meters, for a total height ($H_M$) of about 33.3 meters. In some embodiments, the monopole 110 has a cylindrical (smooth) profile. In other embodiments, the monopole 110 has a "faceted" (i.e., not smooth) cylindrical profile, for example, a 12-sided cylindrical profile.

In some embodiments, the plurality of antennas 120 are mounted above the mast at a height of about 31 meters to about 33 meters above a ground level GL. For example, in some embodiments, the one or more passive antennas 122 may be mounted at a height of 32 meters above ground level GL and the one or more active antennas 124 may be mounted at a height of about 33 meters above ground level GL.

In some embodiments, the plurality of wind turbines 130 are mounted on the telecommunications structure 110 a sufficient distance ($D1_M$) below the plurality of antennas 120 to avoid interference with the radio frequency zones and the line of sight of the antennas 120. In addition, mounting the wind turbines 130 a distance ($D1_M$) below the antennas 120 also provides the advantage of allowing maintenance of the antennas 120 and wind turbines 130 to be independent from each other (i.e., no shutdown is required of one when the other is being serviced). For example, in some embodiments, the plurality of wind turbines 130 may be mounted a distance ($D1_M$) in a range of between about 1 meter and about 2 meters below the plurality of antennas 120.

In addition, the plurality of wind turbines 130 are mounted a sufficient distance ($D2_M$) above ground level GL to maximize the wind exposure for the wind turbines 130 while minimizing the effect of stress and fatigue on the telecommunications structure 110. For example, in some embodiments, the plurality of wind turbines 130 may be mounted a distance ($D2_M$) in a range of between about 10 meters and about 30 meters above ground level GL. This also provides the advantage of easier installation and serviceability of the wind turbines 130 on the telecommunications structure 110 (e.g., compared to installing the wind turbines 130 above the antennas 120), which would require shorter power cables, i.e., routed from the wind turbines 130 to the respective cabinet(s) 140.

As further shown in FIG. 1, and described in further detail below, according to embodiments of the present invention, the plurality of wind turbines 130 may be secured to the telecommunications structure 110 via a mounting kit 200 (see also, e.g., FIGS. 2A-2B). In some embodiments, the mounting kit 200 may be used to retrofit an existing antenna site such that one or more wind turbines 130 may be mounted/secured to the existing telecommunications structure 110.

Referring to FIGS. 2A-2B, an exemplary mounting kit 200 according to embodiments of the present invention is illustrated. As shown in FIGS. 2A-2B, the mounting kit 200 may be used when the telecommunications structure 110 is a monopole (see also, e.g., FIGS. 9A-9C). In other embodiments, as described in further detail below, a different mounting kit 700 may be used to accommodate different telecommunications structures 110 such as a triangular lattice antenna tower (see, e.g., FIGS. 7A-7C) or a square lattice antenna tower (see, e.g., FIGS. 8A-8C). In some embodiments, the mounting kit 200 includes a bracket system 205 that is configured to accommodate and secure three (3) wind turbines 130 to the monopole 110 (i.e., 3×turbine configuration). In other embodiments, a mounting kit may include a bracket system that is configured to accommodate and secure two (2) wind turbines 130 to the monopole 110 (i.e., 2×turbine configuration) (see, e.g., mounting kit 500 and bracket system 505 for monopole assembly 400 illustrated in FIGS. 6A-6B).

As shown in FIGS. 2A-2B, the wind turbines 130 are orientated or have separation of 120 degrees. Thus, at any given wind direction, two of the wind turbines 130 may be exposed to a head wind with the third wind turbine 130 still being able to produce energy, while at a comparatively lower speed. In some embodiments, the three wind turbines 130 are capable of producing enough power to run the monopole/antenna site, thereby providing a significant savings in operation costs. For example, in some embodiments, an estimated annual energy production may be in a range of about 10,000 kWh and about 30,000 kWh.

In some embodiments, the bracket system 205 may comprise a bespoke bracket design. For example, as shown in FIG. 2B, in some embodiments, the bracket system 205 may comprise a pair of ring mounts 210 that are configured to secure the bracket system 205 to the monopole 110. The ring mounts 210 may be configured to secure the bracket system 205 to monopoles having different cross-sectional shapes. In some embodiments, for each wind turbine 130, the bracket system 205 may comprise a pair of offset members 214 that extend outwardly from the ring mounts 210. In some embodiments, one or more cross-support members 216 may be coupled to and extend between the respective pairs of offset members 214 to provide additional structural support to bracket system 205 and mounting kit 200. In some embodiments, the bracket system 205 may further comprise one or more additional support members 218*a*, 218*b*, 218*c* as needed. For example, as shown in FIG. 2B, these additional support members 218*a*, 218*b*, 218*c* may be coupled to and extend between the monopole 110 and a respective offset member 214 and/or a base mount 131 of the wind turbine 130, thereby providing further structural support to the bracket system 205 and mounting kit 200. In some embodiments, the mounting kit 200 may further comprise one or more platforms or foot-rests 220, as well as fall-arrest securing brackets 222, thereby allowing tasks such as inspection, lubrication, and cleaning to be easier and safer to be completed by a technician (see also, e.g., platform assembly 1100 illustrated in FIGS. 9A-9C).

It is noted that the bracket system 205 shown in FIG. 2B illustrates an example bracket system 205 that may be used with the mounting kit 200 of the present invention and that other bracket system designs (for example, antenna mounting brackets) may be used with the mounting kit 200 and antenna assembly 100 of the present invention.

Figure 3:
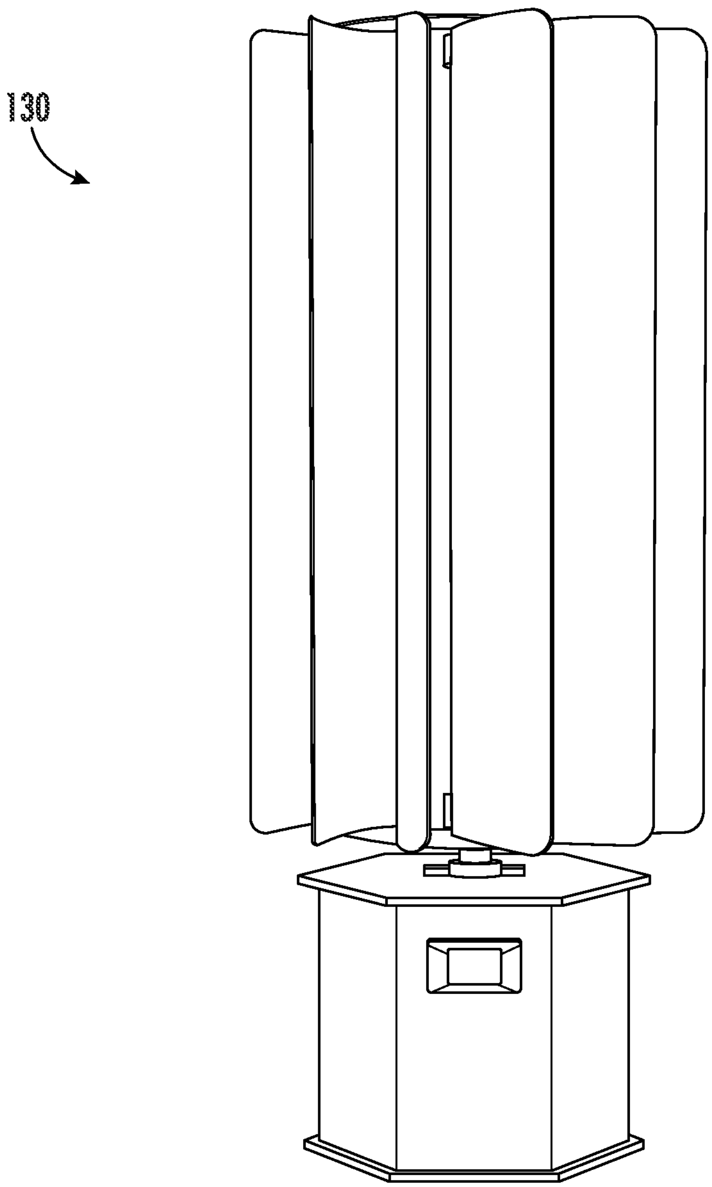
FIG. 3 is a side view of an exemplary wind turbine that may be used with the antenna assembly of FIG. 1 according to embodiments of the present invention.

An exemplary wind turbine 130 that may be used in the antenna assembly 100 of the present invention is illustrated in FIG. 3 (and alternative antenna assemblies 400, 600, 800, 900 described herein). In some embodiments, the wind turbines 130 may be smaller output turbines which produce low vibration and noise (e.g., less than 30 dB). The weight and size of the smaller output turbines provides the advantage of allowing easier installation of the wind turbines 130 onto an existing telecommunications structure 110. In some embodiments, the wind turbines 130 may be able to offset around 1.5 kWh at average wind speeds (e.g., 5 meters/second). An exemplary type of wind turbine 130 that may be used with the antenna assembly 100 (as well as other antenna assemblies 400, 600, 800, 900 described herein) is the TESUP Atlas X Wind Turbine (TESUP Electronics Limited, London, United Kingdom).

Figure 4:
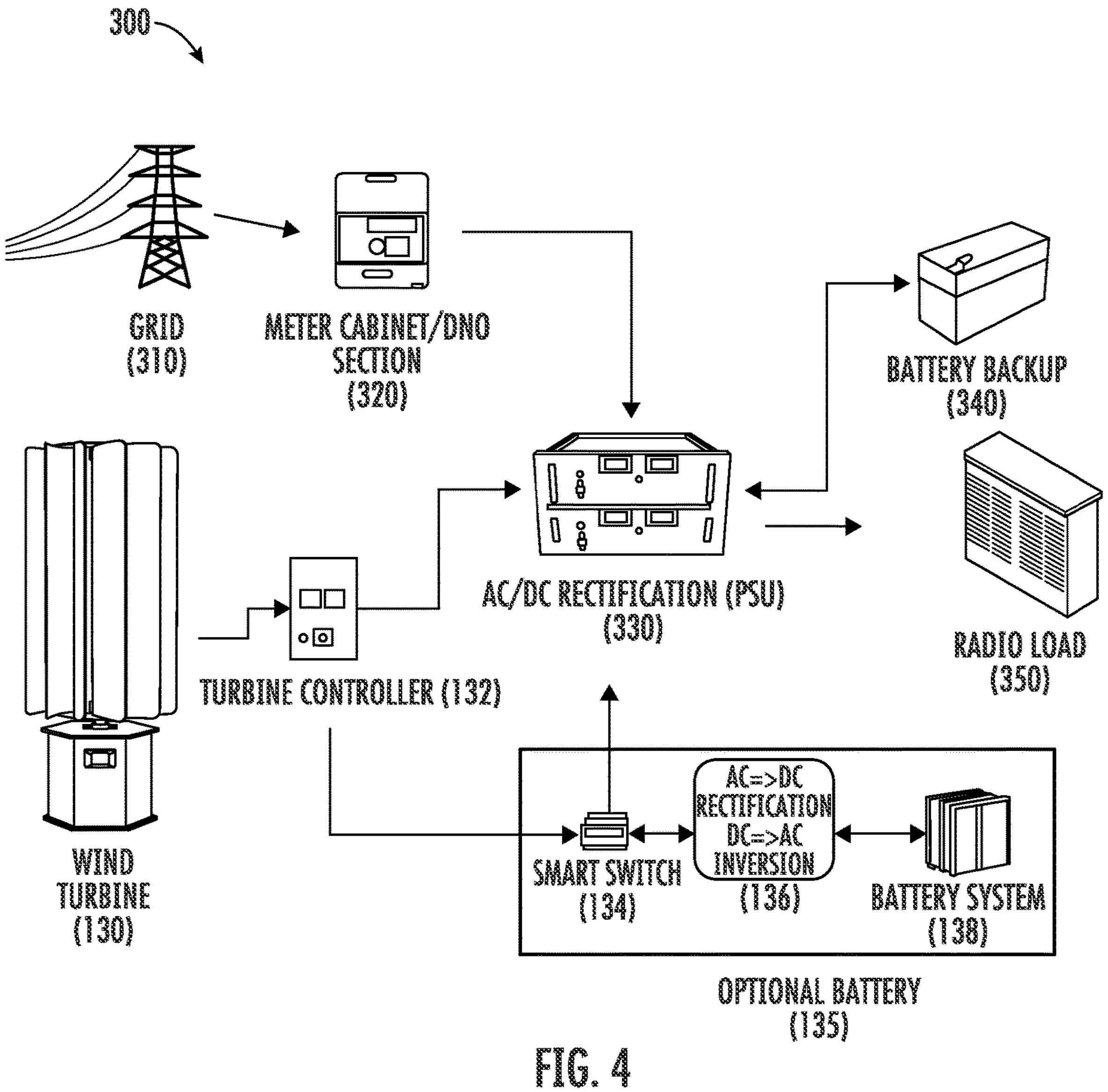
FIG. 4 is a schematic diagram of an exemplary power connection system for the wind turbines used with the antenna assembly according to embodiments of the present invention.

Referring to FIG. 4, a schematic diagram for an exemplary power connection system 300 for the antenna assembly 100 (and alternative antenna assemblies 400, 600, 800, 900 described herein) according to embodiments of the present invention is illustrated. As shown in FIG. 4, in some embodiments, the electrical current (i.e., AC) generated from the wind turbine 130 flows to a turbine controller 132. The turbine controller 132 is configured to send the alternating current (AC) to an AC/DC rectification unit 330 which converts the alternating current (AC) from the wind turbine 130 to direct current (DC) that can be sent to a battery 340 and/or a radio 350 that is connected with one or more of the antennas 120 mounted at the top of the telecommunications structure 110. In addition, current being supplied by a corresponding power grid 310 (e.g., supplying power to the monopole/antenna site) may also be sent to the AC/DC rectification unit 330 via the electrical grid equipment contained within one of the cabinets 140.

As shown in FIG. 4, in some embodiments, the connection system 300 of the antenna assembly 100 may also comprise an optional battery 135. The optional battery 135 may include a smart switch 134, a separate AC/DC rectification and/or DC/AC inversion unit 136, and a battery system 138. In some embodiments, the turbine controller 132 may also be configured to transmit the alternating current (AC) of the wind turbine 130 to the optional battery 135. In some embodiments, the smart switch 134 of the optional battery 135 may be configured to redirect the alternating current (AC) received from the wind turbine 130 to the AC/DC rectification unit 330. The same or similar connection system 300 may be used with the alternative antenna assemblies 400, 600, 800, 900 described herein.

Figure 5:
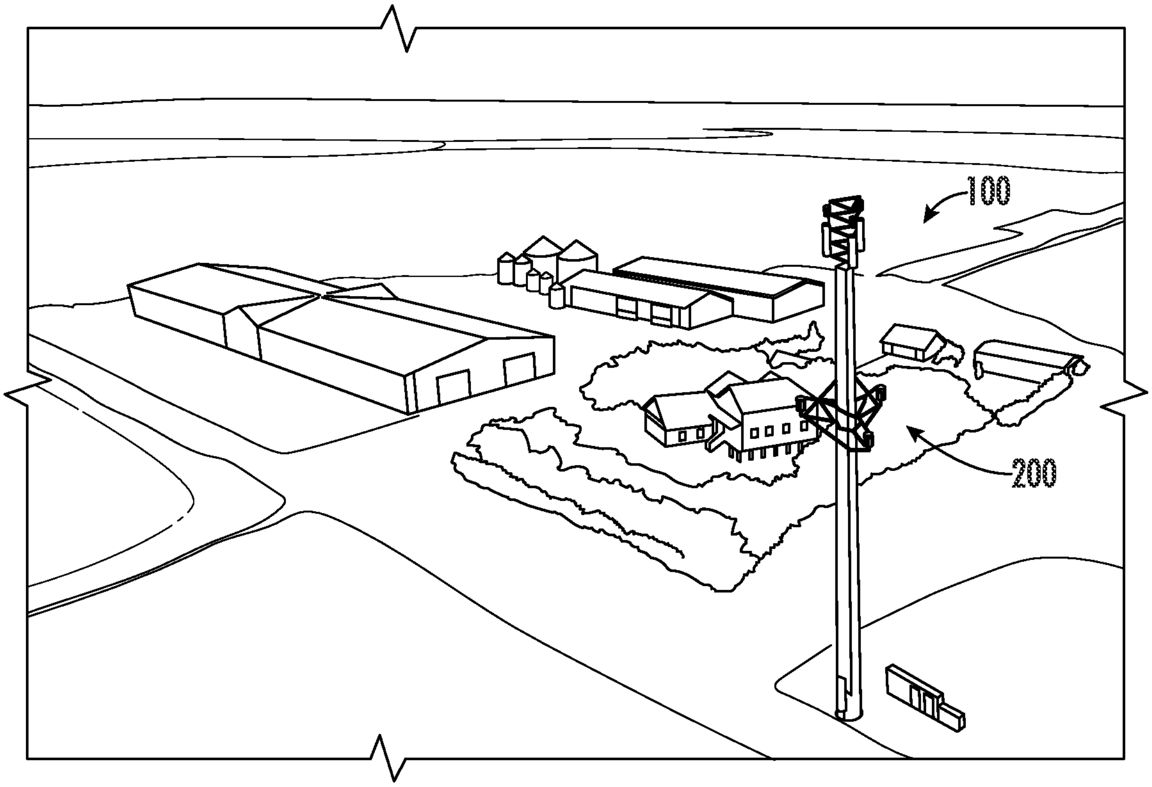
FIG. 5 is a perspective environmental view of the antenna assembly of FIG. 1 according to embodiments of the present invention.

FIG. 5 is an environmental view the antenna assembly 100 of the present invention being used at an exemplary rural site.

Figure 6A:
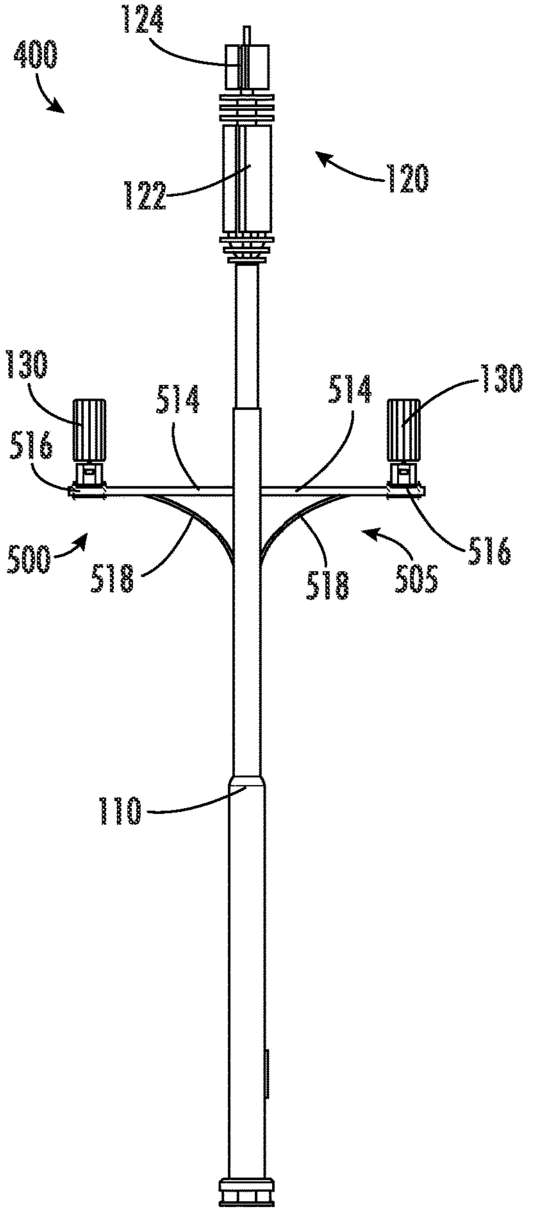
FIG. 6A is a view of another antenna assembly having wind turbines mounted thereon according to embodiments of the present invention.
Figure 6B:
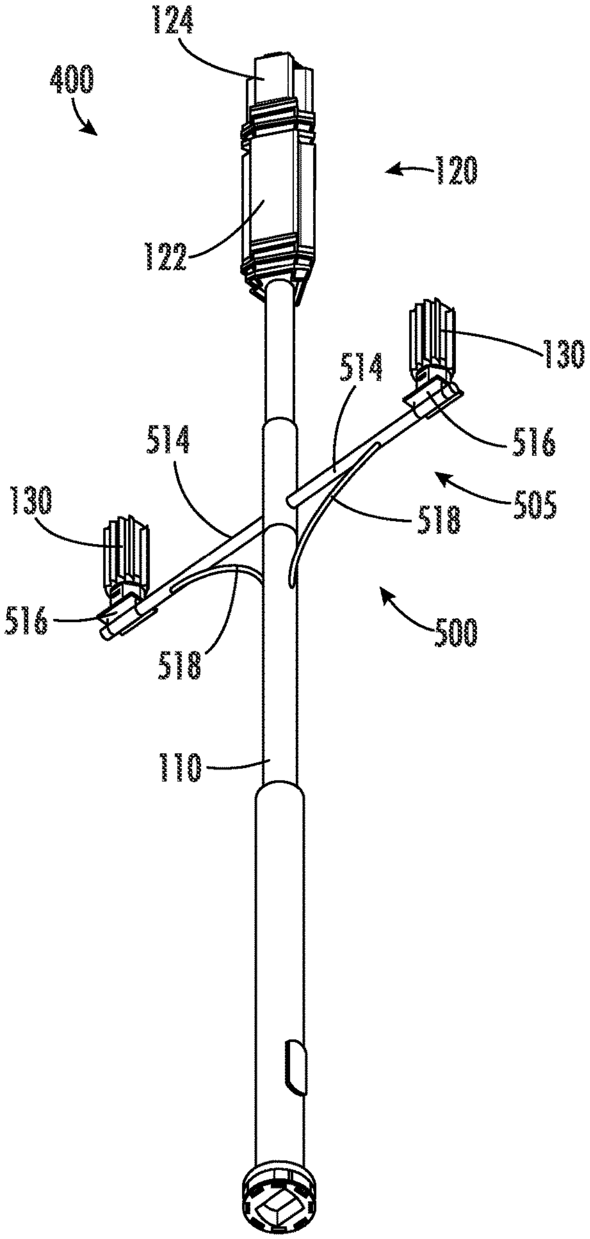
FIG. 6B is a bottom perspective view of the antenna assembly of FIG. 6A.

Referring to FIGS. 6A-6B, another antenna assembly 400 according to embodiments of the present invention is illustrated. Properties and/or features of the antenna assembly 400 may be as described above in reference to the antenna assembly 100 shown in FIGS. 1-5 and duplicate discussion thereof may be omitted herein for the purposes of discussing FIGS. 6A-6B. The antenna assembly 400 differs from the antenna assembly 100 described herein in that the mounting kit 500 includes a bracket system 505 configured to accommodate and secure two (2) wind turbines 130 (i.e., 2×turbine configuration) to the telecommunications structure 110 (i.e., monopole as illustrated in FIGS. 6A-6B).

As shown in FIGS. 6A-6B, the wind turbines 130 are orientated or have separation of 180 degrees. In some embodiments, the bracket system 505 comprises a pair of offset members 514 that extend outwardly from the monopole 110. In some embodiments, one or more support members 518 may be coupled to and extend between the monopole 110 and the offset members 514 to provide structural support to bracket system 505 and mounting kit 500. In some embodiments, the bracket system 505 may further comprise base supports 516 at the free ends of the offset members 514. The base supports 516 may be configured to have a respective wind turbine 130 mounted and secured thereto Similar to the mounting kit 200 described herein, in some embodiments, the mounting kit 500 may further comprise one or more platforms or foot-rests, as well as fall-arrest securing brackets, thereby allowing tasks such as inspection, lubrication, and cleaning to be easier and safer to be completed by a technician (see also, e.g., platform assembly 1100 illustrated in FIGS. 9A-9C).

It is noted that the bracket system 505 shown in FIGS. 6A-6B illustrates an example bracket system 505 that may be used with the mounting kit 500 of the present invention and that other bracket system designs (for example, antenna mounting brackets) may be used with the mounting kit 500 and antenna assembly 400 of the present invention.

Figure 7A:
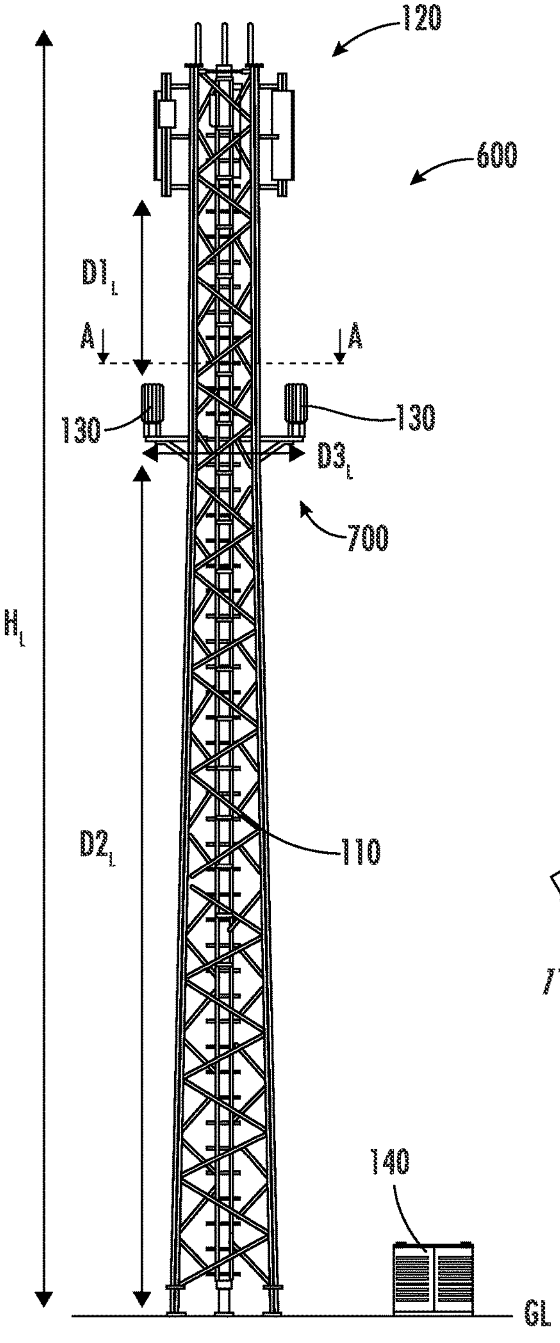
FIG. 7A is a side view of another antenna assembly having wind turbines mounted thereon according to embodiments of the present invention.
Figure 7B:
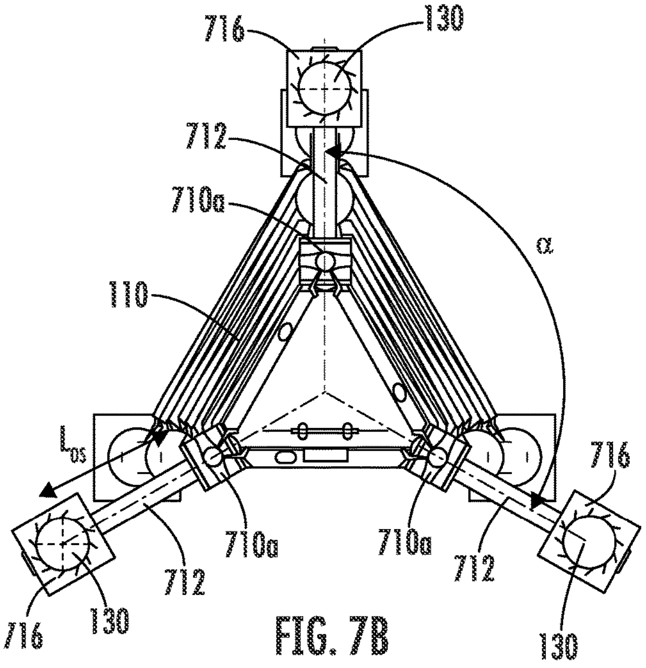
FIG. 7B is a top sectional view of the antenna assembly of FIG. 7A taken along section line A-A.
Figure 7C:
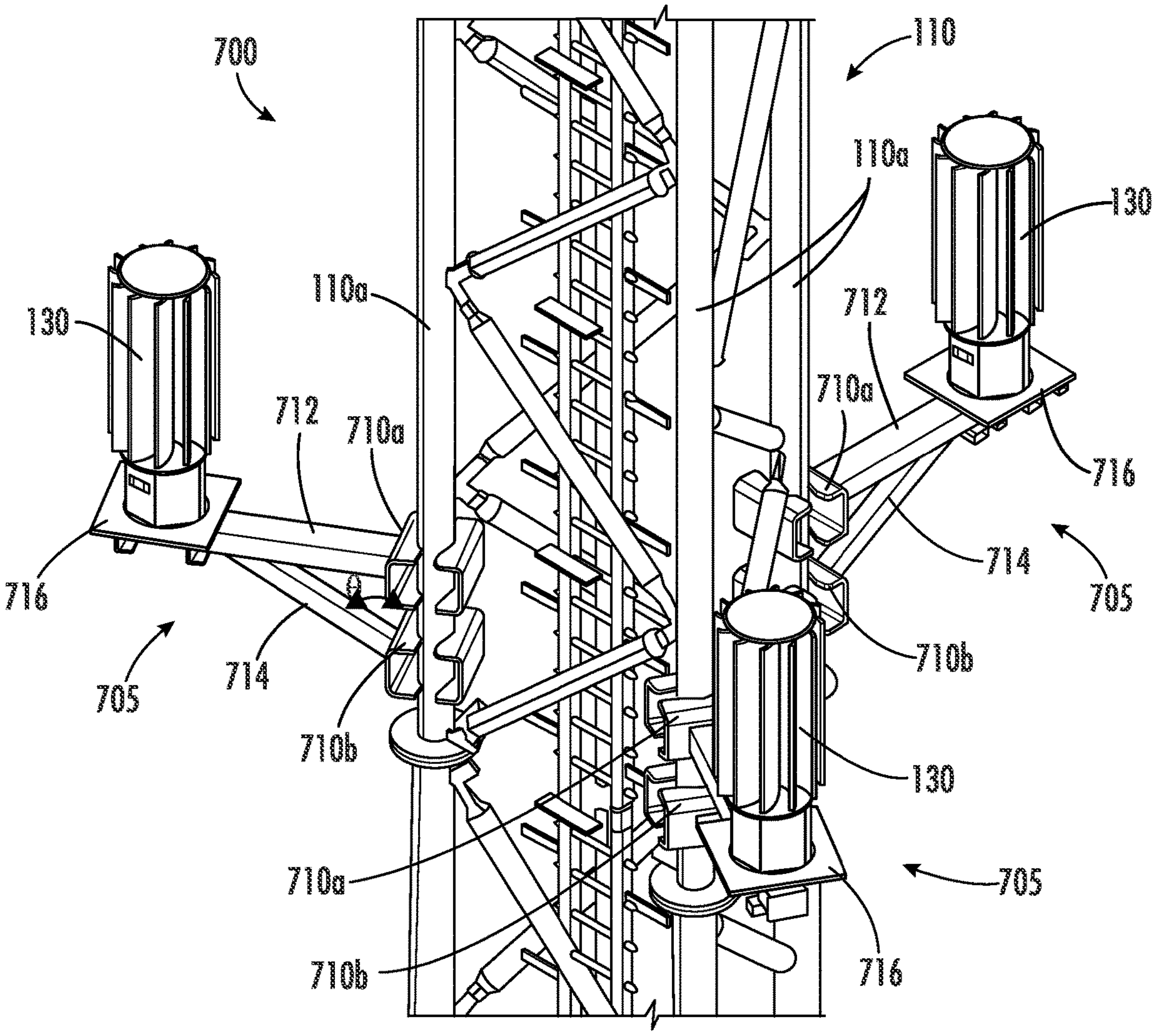
FIG. 7C is an enlarged top perspective view of the wind turbine mounting kit used with the antenna assembly of FIG. 7C.
Figure 8A:
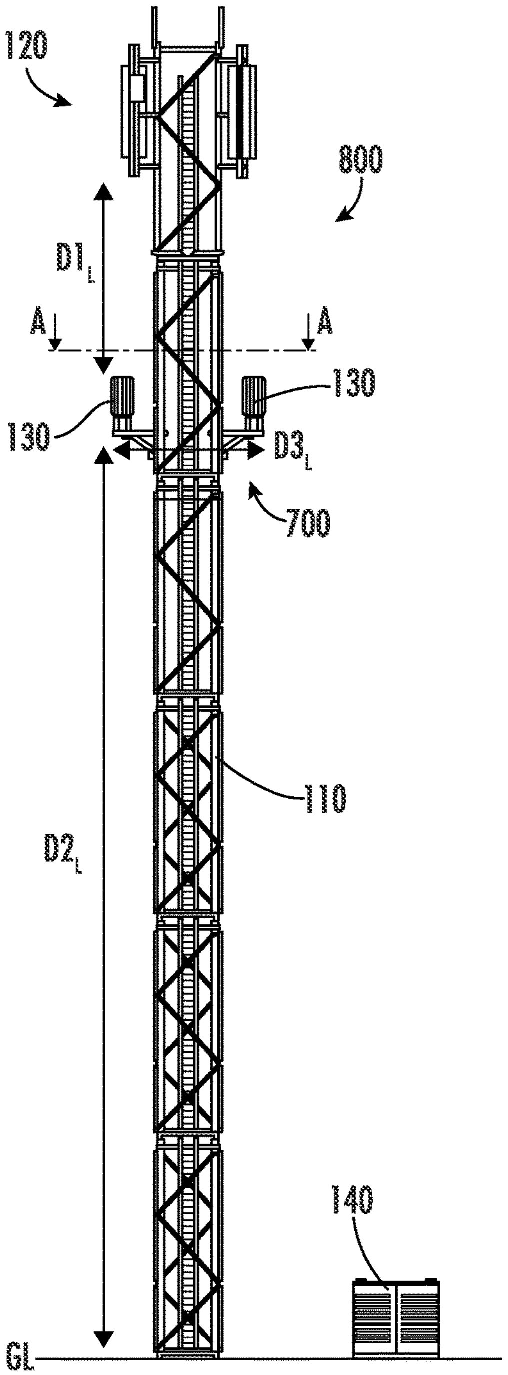
FIG. 8A is a side view of another antenna assembly having wind turbines mounted thereon according to embodiments of the present invention.
Figure 8B:
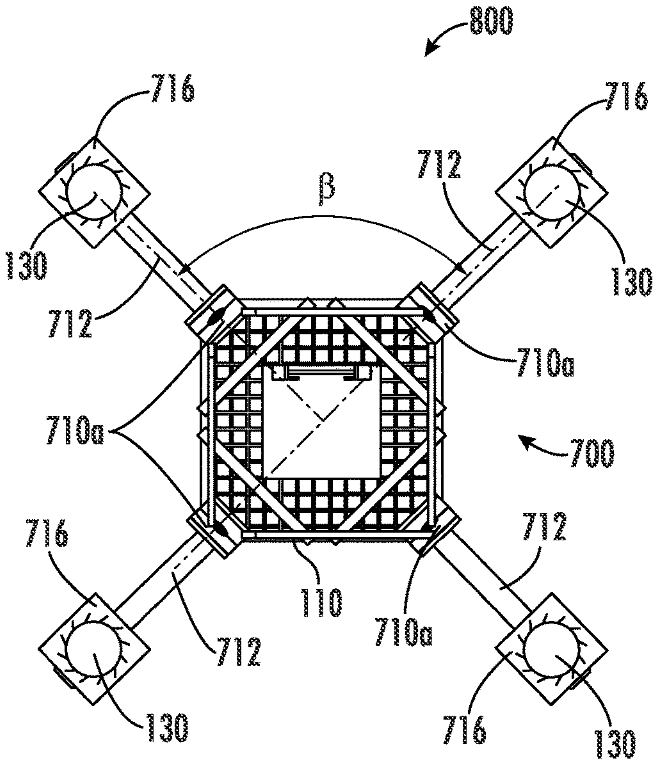
FIG. 8B is a top sectional view of the antenna tower assembly of FIG. 8A taken along section line A-A.
Figure 8C:
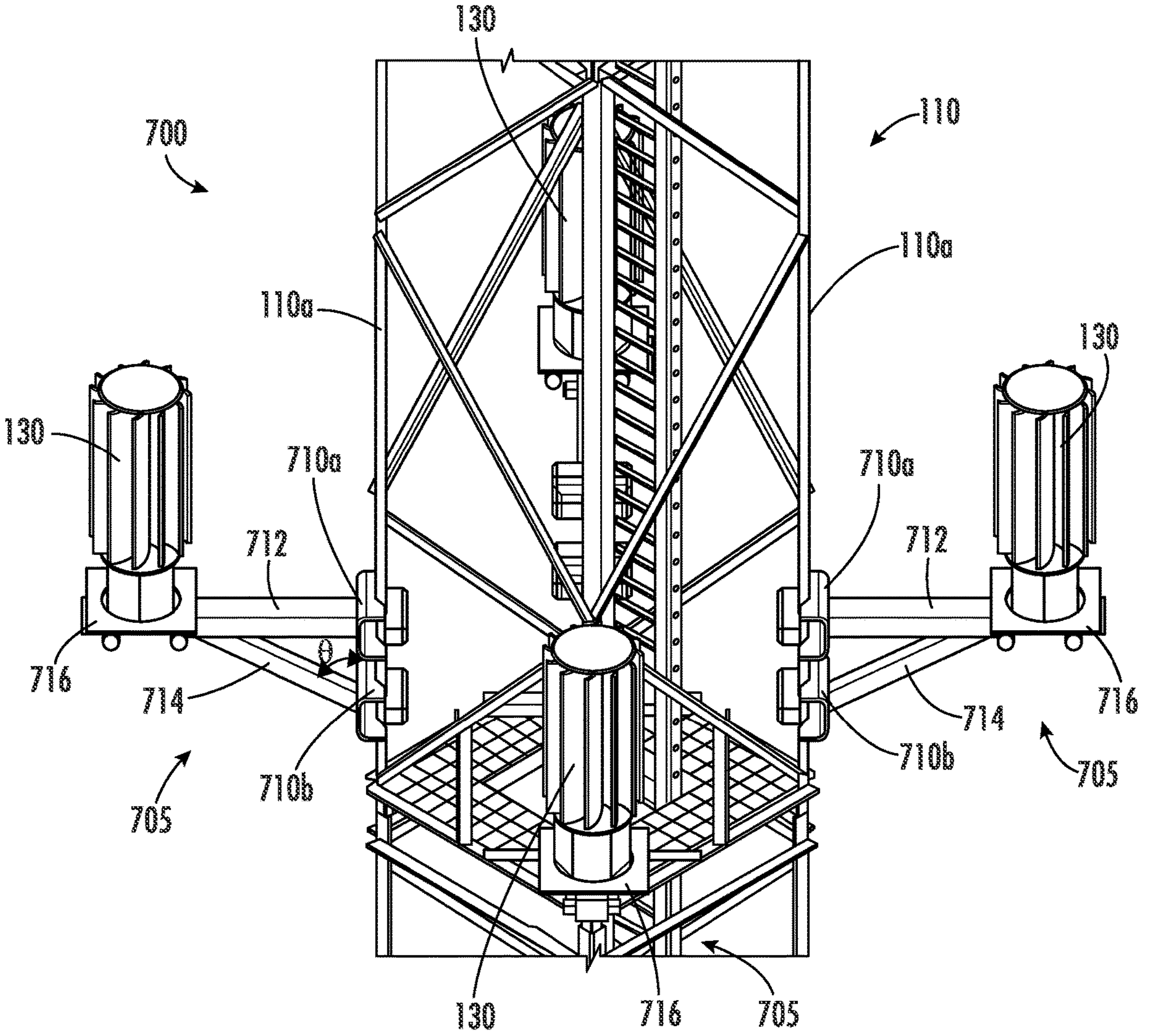
FIG. 8C is an enlarged top perspective view of the wind turbine mounting kit used with the antenna assembly of FIG. 8C.

Referring to FIGS. 7A-7C and FIGS. 8A-8C, additional antenna assemblies 600, 800 according to embodiments of the present invention are illustrated. Properties and/or features of the antenna assemblies 600, 800 may be as described above in reference to the antenna assemblies 100, 400 shown in FIGS. 1-6B and duplicate discussion thereof may be omitted herein for the purposes of discussing FIGS. 7A-7C and FIGS. 8A-8C. The antenna assemblies 600, 800 differ from the antenna assemblies 100, 400 described herein in that the telecommunications structure 110 is a lattice antenna tower (e.g., having a triangular or square profile) and utilizes a different mounting kit 700 to secure one or more wind turbines 130 to the lattice antenna tower 110. For example, as shown in FIGS. 7A-7C, in some embodiments, the mounting kit 700 may be used to secure three (3) wind turbines 130 to a triangular lattice antenna tower 110 (i.e., 3×turbine configuration). As shown in FIGS. 8A-8C, in some embodiments, the mounting kit 700 may be used to secure four (4) wind turbines 130 to a square lattice antenna tower 110 (i.e., 4×turbine configuration).

As shown in FIGS. 7A-7C and FIGS. 8A-8C, similar to the antenna assemblies 100, 400 described herein, the antenna assemblies 600, 800 each further includes a plurality of antennas 120, a plurality of wind turbines 130, and one or more equipment cabinets 140. In some embodiments, the plurality of antennas 120 may include one or more passive antennas 122 and/or one or more active antennas 124. In some embodiments, the one or more equipment cabinets 140 may include a cabinet for radios, a cabinet for electrical grid equipment, and a cabinet for wind turbine unit equipment.

The lattice antenna tower 110 has a height ($H_L$). In some embodiments, the lattice antenna tower 110 has a height ($H_L$) up to 200 meters or more, but typically in a range of between about 15 meters to about 60 meters. In some embodiments, the plurality of wind turbines 130 are mounted on the lattice antenna tower 110 a sufficient distance ($D1_L$) below the plurality of antennas 120 to avoid interference with the radio frequency zones and the line of sight of the antennas 120. In addition, mounting the wind turbines 130 a distance ($D1_L$) below the antennas 120 also provides the advantage of allowing maintenance of the antennas 120 and wind turbines 130 to be independent from each other (i.e., no shutdown is required of one when the other is being serviced). For example, in some embodiments, the plurality of wind turbines 130 may be mounted a distance ($D1_L$) in a range of between about 1 meter and about 2 meters below the plurality of antennas 120. In some embodiments, the antenna assemblies 600, 800 have a structural width ($D3_L$) in the range of between about 3 meters and about 8 meters.

In addition, the plurality of wind turbines 130 are mounted a sufficient distance ($D2_L$) above ground level GL to maximize the wind exposure for the wind turbines 130 while minimizing the effect of stress and fatigue on the lattice antenna tower 110. This also provides the advantage of easier installation and serviceability of the wind turbines 130 on the lattice antenna tower 110 (e.g., compared to installing the wind turbines 130 above the antennas 120), which would require shorter power cables, i.e., routed from the wind turbines 130 to the respective cabinet(s) 140. For example, in some embodiments, the plurality of wind turbines 130 may be mounted a distance ($D2_L$) in a range of between about 10 meters or more above ground level GL, and typically between about 10 meters and about 30 meters above ground level GL. The distance ($D2_L$) the plurality of wind turbines 130 is mounted above ground level GL is dictated by the availability of wind a higher heights along the lattice antenna tower 110. In some embodiments, the plurality of wind turbines 130 may be mounted a greater distance ($D2_L$) above ground level GL based on the height available for a particular lattice antenna tower 110 and if there are no other equipment constraints. In some embodiments, the wind turbines 130 may be positioned a distance ($D3_L$) apart from each other in a range of between about 3 meters and about 5 meters.

As further shown in FIGS. 7A-7C and FIGS. 8A-8C, and described in further detail below, according to embodiments of the present invention, the plurality of wind turbines 130 may be secured to the lattice antenna tower 110 via a mounting kit 700. In some embodiments, the mounting kit 700 may be used to retrofit an existing antenna site such that one or more wind turbines 130 may be mounted/secured to the existing lattice antenna tower 110. In some embodiments, the mounting kit 700 is configured to secure one, two, three or four wind turbines to the lattice antenna tower 110. For example, as shown in FIG. 7B-7C, the mounting kit 700 may be configured to accommodate and secure three (3) wind turbines 130 to the lattice antenna tower 110 (e.g., having a triangular profile) (i.e., 3×turbine configuration). As shown in FIGS. 8B-8C, the mounting kit 700 may be configured to accommodate and secure four (4) wind turbines 130 to the lattice antenna tower 110 (e.g., having a square profile) (i.e., 4×turbine configuration).

As shown in FIG. 7B, the wind turbines 130 are orientated or have a separation of 120 degrees (a). Thus, at any given wind direction, two of the wind turbines 130 may be exposed to a head wind with the third wind turbine 130 still being able to produce energy, while at a comparatively lower speed. In some embodiments, the three wind turbines 130 are capable of producing enough power to run the antenna site, thereby providing a significant savings in operation costs. For example, in some embodiments, an estimated annual energy production may be in a range of about 10,000 kWh and about 30,000 kWh. As shown in FIG. 8B, the wind turbines 130 are oriented or have a separation of 90 degrees (B). In some embodiments, the energy production for the wind turbines 130 having a separation of 90 degrees (B) (i.e., 4×turbine configuration) may be higher than the energy production for the wind turbines 130 having a separation of 120 degrees (a) (i.e., 3×turbine configuration) due to additional turbulence from the lattice antenna tower 110.

The mounting kit 700 of the present invention includes a plurality of bracket systems 705 configured to secure the respective wind turbines 130 to the telecommunications structure 110 (i.e., lattice antenna tower). The number of bracket systems 705 on the mounting kit 700 is equal to the number of wind turbines 130 to be mounted to the lattice antenna tower 110. As shown in FIGS. 7B-7C and FIGS. 8B-8C, in some embodiments, each bracket system 705 may comprise a pair of clamp mount assemblies 710*a*, 710*b* (i.e., an upper clamp assembly 710*a* and a lower clamp assembly 710*b*) that are configured to secure the bracket system 705 for each wind turbine 130 to a respective leg 110*a* of the lattice antenna tower 110. In some embodiments, the clamp mount assemblies 710*a*, 710*b* may be configured to secure the bracket system 705 to legs 110*a* of lattice antenna towers 110 having different cross-sectional shapes. In some embodiments, the clamp mounts 710*a*, 710*b* may be standard clamping assemblies that have front and rear clamping members which are held together by threaded bolts or rods and secured with nuts. Tightening of the bolts enables the front and rear clamping members to clamp onto the leg 110*a* of the lattice antenna tower 110, with the leg 110*a* being held between the clamping members of the respective clamp mount assemblies 710*a*, 710*b* (see, e.g., FIG. 7C and FIG. 8C).

In some embodiments, each bracket system 705 may further comprise an offset member 712, a brace member 714, and a mount plate 716. The offset member 712 is coupled to and extends outwardly from an upper clamp assembly 710*a*. In some embodiments, the offset member 712 has a length (Los) in a range of between about 1 meter and about 3 meters. The mount plate 716 is secured to an opposing end of the offset member 712 (i.e., the end opposite to the upper clamp assembly 710*a*). The mount plate 716 is sized and configured such that a wind turbine 130 can be mounted and secured thereon. The brace member 714 is coupled to and extends outwardly from the lower clamp assembly 710*b* at an upward angle (θ) toward the offset member 712 (see, e.g., FIG. 7C and FIG. 8C). For example, in some embodiments, the brace member 714 extends outwardly at an angle (θ) in the range of between about 45 degrees and about 60 degrees. The brace member 714 is secured to the offset member 712 (e.g., via welding) and provides structural support to offset member 712 (and wind turbine 130 mounted to the mount plate 716). In some embodiments, the bracket system 705 may further comprise one or more additional brace members 714, as needed. In some embodiments, the offset and brace members 712, 714 are tubular having a square or rectangular cross-section. In some embodiments, the mounting kit 700 may further comprise one or more platforms or foot-rests 220, as well as fall-arrest securing brackets 222 (see, e.g., FIG. 2B), thereby allowing tasks such as inspection, lubrication, and cleaning to be easier and safer to be completed by a technician (see also, e.g., FIGS. 9A-9C).

Figure 9A:
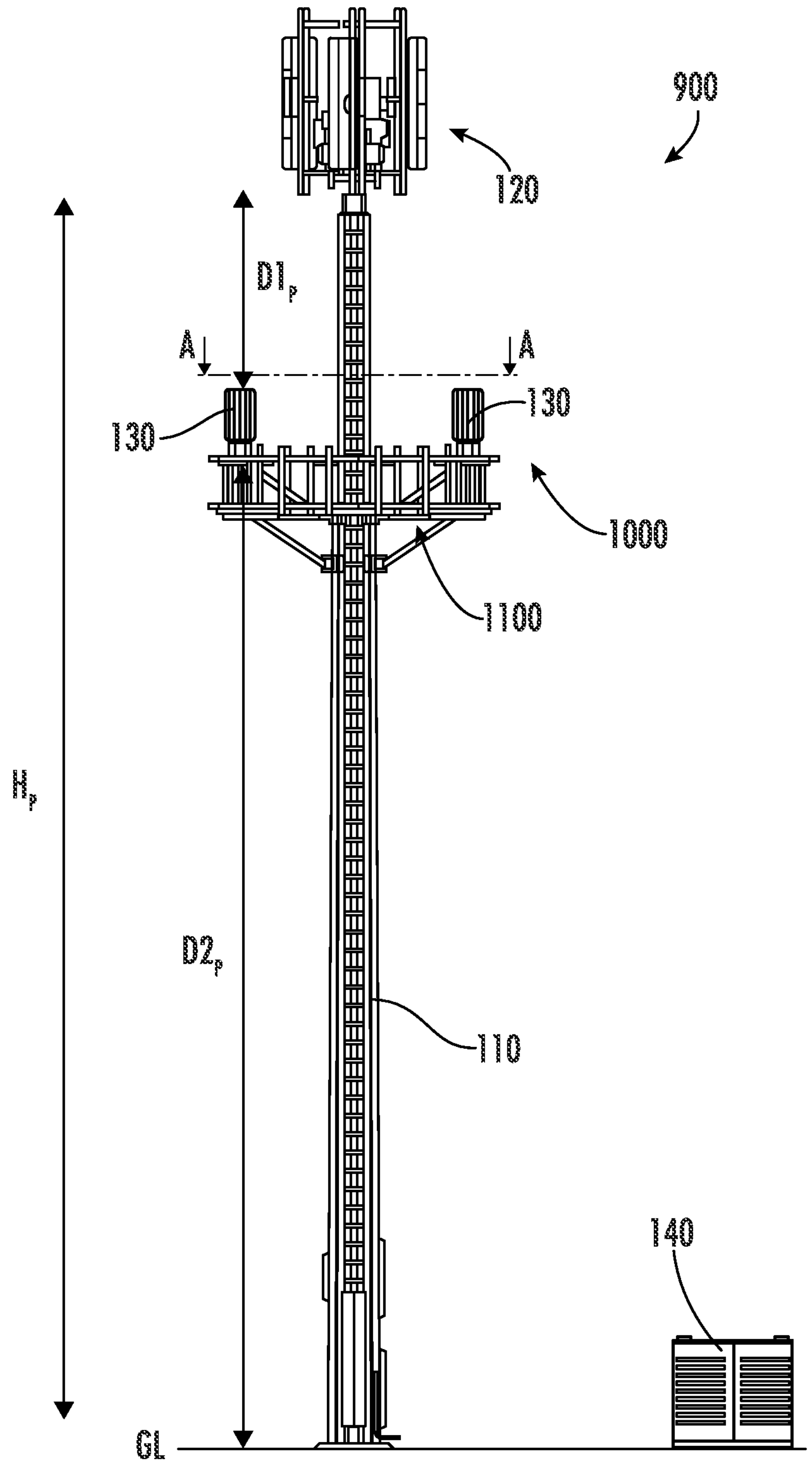
FIG. 9A is a side view of another antenna assembly including a platform assembly and having wind turbines mounted thereon according to embodiments of the present invention.
Figure 9B:
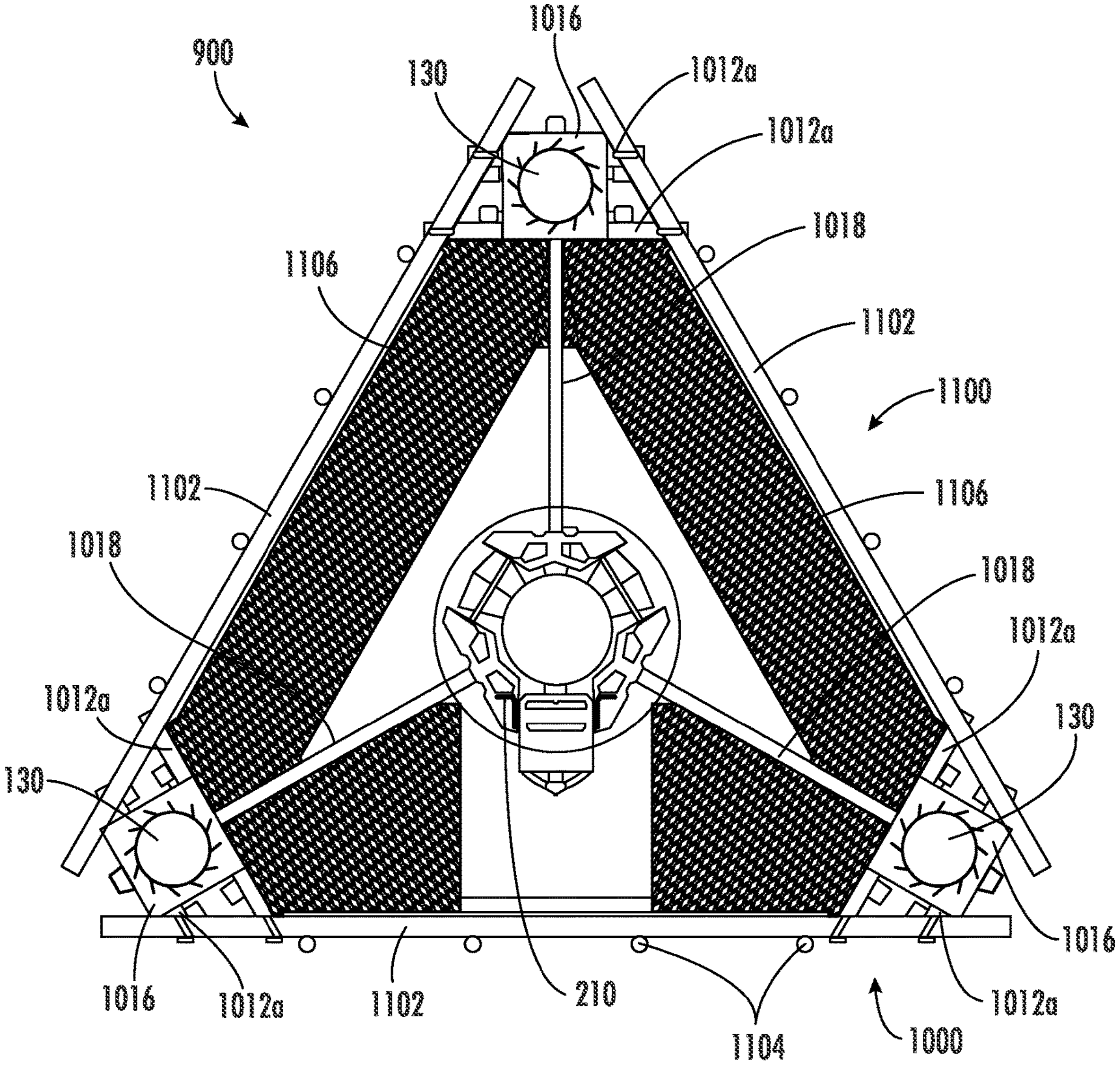
FIG. 9B is a top sectional view of the antenna assembly of FIG. 9A taken along section line A-A.
Figure 9C:
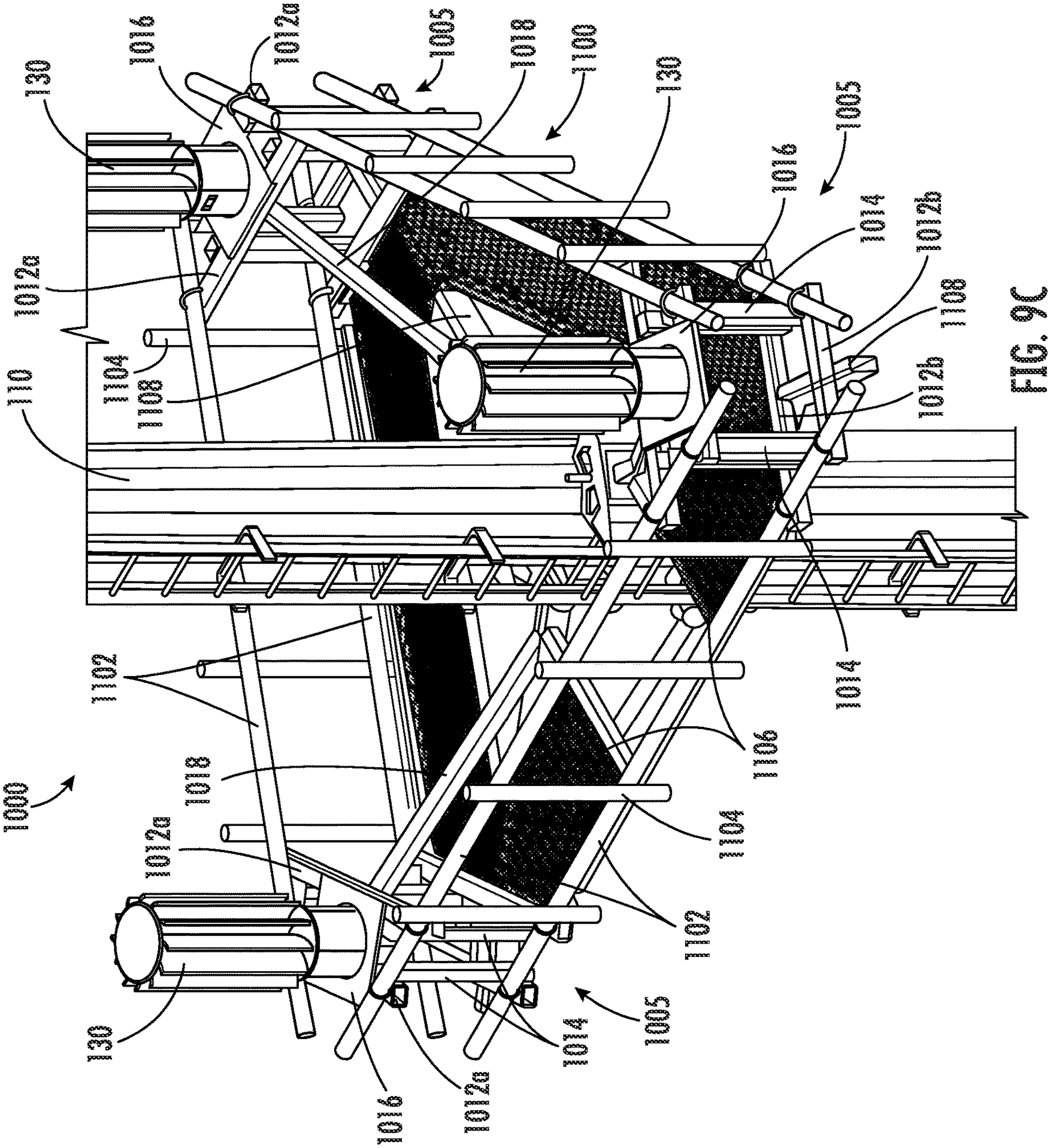
FIG. 9C is an enlarged top perspective view of the platform assembly and wind turbine mounting kit used with the antenna assembly of FIG. 9A.

Referring to FIGS. 9A-9C, another antenna assembly 900 according to embodiments of the present invention are illustrated. Properties and/or features of the antenna assembly 900 may be as described above in reference to the antenna assemblies 100, 400, 600, 800 shown in FIGS. 1-8C and duplicate discussion thereof may be omitted herein for the purposes of discussing FIGS. 9A-9C. The antenna assembly 900 differs from the antenna assemblies 100, 400, 600, 800 described herein in that the telecommunications structure 110 (e.g., a monopole) includes a platform assembly 1100 and utilizes a different mounting kit 1000 to secure one or more wind turbines 130 to the telecommunications structure 110.

As shown in FIGS. 9A-9C, similar to the antenna assemblies 100, 400, 600, 800 described herein, the antenna assembly 900 further includes a plurality of antennas 120, a plurality of wind turbines 130, and one or more equipment cabinets 140. In some embodiments, the plurality of antennas 120 may include one or more passive antennas 122 and/or one or more active antennas 124. In some embodiments, the one or more equipment cabinets 140 may include a cabinet for radios, a cabinet for electrical grid equipment, and a cabinet for wind turbine unit equipment.

The telecommunications structure 110 has a height ($H_P$) similar to other telecommunications structures 110 described herein. In some embodiments, the plurality of wind turbines 130 are mounted on the telecommunications structure 110 a sufficient distance ($D1_p$) below the plurality of antennas 120 to avoid interference with the radio frequency zones and the line of sight of the antennas 120. As shown in FIG. 9A, in some embodiments, the wind turbines 130 are mounted above the platform assembly 1100 relative to the telecommunications structure 110. In addition, mounting the wind turbines 130 a distance ($D1_L$) below the antennas 120 also provides the advantage of allowing maintenance of the antennas 120 and wind turbines 130 to be independent from each other (i.e., no shutdown is required of one when the other is being serviced). For example, in some embodiments, the plurality of wind turbines 130 may be mounted a distance ($D1_P$) in a range of between about 1 meter and about 2 meters below the plurality of antennas 120. In addition, the plurality of wind turbines 130 are mounted a sufficient distance ($D2_P$) above ground level GL to maximize the wind exposure for the wind turbines 130 while minimizing the effect of stress and fatigue on the telecommunications structure 110.

As described in further detail below, according to embodiments of the present invention, the plurality of wind turbines 130 may be secured to the telecommunications structure 110 (e.g., monopole) via a mounting kit 1000. In some embodiments, the mounting kit 1000 may be used to retrofit an existing monopole/antenna site such that one or more wind turbines 130 may be mounted/secured to the existing monopole 110.

As shown in FIGS. 9A-9C, a platform assembly 1100 is secured to the monopole 110 via a ring mount 210. In some embodiments, the platform assembly 1100 is a standard platform. For example, in some embodiments, the platform assembly 1100 comprises a plurality of offset members 1108 that extend radially outwardly from the ring mount 210. One or more lower auxiliary support members 1012*b* are coupled to an opposing end of each offset member 1108. A lower horizontal pipe member 1102 extends between each pair of lower auxiliary support members 1012*b* and is secured thereto by fasteners (e.g., U-bolts). An upper horizontal pipe member 1102 extends parallel to each respective lower horizontal pipe member 1102. The corresponding upper and lower horizontal pipe members 1102 are coupled together via a plurality of vertical pipe members 1104. In some embodiments, the platform assembly 1100 further comprises one or more upper auxiliary support members 1012*a* that are coupled to and extend between adjacent upper horizontal pipe members 1102. The platform assembly 1100 further comprises grating walkways 1106 coupled to the offset members 1108, support members 1012*a*, 1012*b*, and lower horizontal pipe members 1102.

As further shown in FIGS. 9B-9C, in some embodiments, the mounting kit 1000 for the wind turbines 130 includes a bracket system 1105. The bracket system 1105 may include a plurality of vertical support members 1014 that are coupled to and extend between respective upper and lower auxiliary support members 1012*a*, 1012*b*. A mounting plate 1016 is secured to corresponding upper auxiliary support members 1012*a*. The mounting plates 1016 are each configured to have a wind turbine 130 mounted and secured thereto. In some embodiments, the mounting kit 1000 further comprises a brace member 1018 that is coupled to and extends between each offset member 1108 of the platform assembly 1100 and an upper auxiliary support member 1012*a* (i.e., at an angle), thereby providing additional structural support to the mounting plate 1016 and respective wind turbine 130 secured thereto.

For a low power consumption site which only requires 1.5 kWh or annually 13,137 kWh, the power generated from the wind turbines may be more than adequate, and thus the remaining unused energy can be the source for any additional service that can be provided along with the monopole/antenna site. For example, electric vehicle charging stations are one of the emerging facilities that is growing all around the world. An opportunity may exist to collaborate telecommunication sites with electric vehicle charging stations in low power consumption sites where the surplus energy produced from an off-grid solution can be used.

The antenna assemblies 100, 400, 600, 800, 900 of the present invention provides a number of advantages including ease of integration into an existing antenna site, the ability to maintain operation of the antenna site during installation and maintenance, the ability to supply a third or more of the power required to run the antenna site, the wind turbines are quiet in operation, as well as multiple economic benefits.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An antenna assembly, the antenna assembly comprising:

a telecommunications structure;

one or more equipment cabinets;

a plurality of antennas mounted to the telecommunications structure, the plurality of antennas including one or more passive antennas and one or more active antennas; and three wind turbines mounted to the telecommunications structure 120 degrees apart from each other by a mounting kit, the three wind turbines positioned on the telecommunications structure a distance below the plurality of antennas.

2. The antenna assembly according to claim 1, wherein the distance of the three wind turbines below the plurality of antennas is in a range of between about 1 meter and about 2 meters.

3. The antenna assembly according to claim 1, wherein the three wind turbines are mounted to the telecommunications structure a distance in a range of between about 10 meters and about 30 meters above a ground level.

4. The antenna assembly according to claim 1, wherein the mounting kit includes a bracket system comprising a pair of ring mounts and a pair of offset members for each of the wind turbines, each pair of offset members extending outwardly from the ring mounts and configured to have a respective wind turbine secured thereto.

5. The antenna assembly according to claim 4, wherein the bracket system further comprises one or more cross-support members coupled to and extending between the respective pairs of offset members.

6. The antenna assembly according to claim 1, wherein the mounting kit comprises a plurality of bracket systems, each bracket system comprising an upper clamping assembly, a lower clamping assembly, an offset member coupled to and extending outwardly from the upper clamping assembly, a brace member coupled to an extending outwardly from the lower clamping assembly, and a mount plate coupled the offset member and configured to have a respective wind turbine mounted and secured thereto.

7. The antenna assembly according to claim 1, wherein the mounting kit comprises a platform assembly secured to the telecommunications structure via a ring mount, the platform assembly comprises:

a plurality of offset members that extend radially outwardly from the ring mount, one or more lower auxiliary support members coupled to an opposing end of each offset member, a lower horizontal pipe member extending between each pair of lower auxiliary support members;

an upper horizontal pipe member extending parallel to each respective lower horizontal pipe member and is coupled together via a plurality of vertical pipe members;

one or more upper auxiliary support members that are coupled to and extend between adjacent upper horizontal pipe members; and one or more grating walkways coupled to the offset members, lower auxiliary support members, and lower horizontal pipe members.

8. The antenna assembly according to claim 7, wherein the mounting kit includes a bracket system comprising a plurality of vertical support members that are coupled to and extend between respective upper and lower auxiliary support members, a mounting plate secured to corresponding upper auxiliary support members and configured to have a wind turbine mounted and secured thereto, and a brace member that is coupled to and extends between each offset member of the platform assembly and an upper auxiliary support member.

9. An antenna assembly, the antenna assembly comprising:

a monopole;

a plurality of antennas mounted to the monopole; and three wind turbines mounted to the monopole a distance below the plurality of antennas by a mounting kit, wherein the mounting kit includes a bracket system comprising a pair of ring mounts and a pair of offset members for each of the wind turbines, each member of the pair of offset members extending outwardly from the ring mounts and configured to have a respective wind turbine secured thereto.

10. The antenna assembly according to claim 9, further comprising one or more equipment cabinets, wherein the one or more equipment cabinets include a cabinet for radios, a cabinet for electrical grid equipment and/or a cabinet for wind turbine unit equipment.

11. The antenna assembly according to claim 9, wherein the distance of the three wind turbines below the plurality of antennas is in a range of between about 1 meter and about 2 meters.

12. The antenna assembly according to claim 9, wherein the three wind turbines are mounted to the monopole a distance in a range of between about 10 meters and about 30 meters above a ground level.

13. The antenna assembly according to claim 9, wherein the three wind turbines have 120 degrees of separation between each other when mounted to the monopole.

14. The antenna assembly according to claim 9, wherein the bracket system further comprises one or more cross-support members coupled to and extending between the respective pairs of offset members.

15. An antenna assembly, the antenna assembly comprising:

a lattice antenna tower;

a plurality of antennas mounted to the lattice antenna tower; and one or more wind turbines mounted to the lattice antenna tower a distance below the plurality of antennas by a mounting kit, wherein the mounting kit includes one or more bracket systems, each bracket system comprising an upper clamping assembly, a lower clamping assembly, an offset member coupled to and extending outwardly from the upper clamping assembly, a brace member coupled to an extending outwardly from the lower clamping assembly, and a mount plate coupled the offset member and configured to have a respective wind turbine mounted and secured thereto.

16. The antenna assembly according to claim 15, further comprising one or more equipment cabinets, wherein the one or more equipment cabinets include a cabinet for radios, a cabinet for electrical grid equipment and/or a cabinet for wind turbine unit equipment.

17. The antenna assembly according to claim 15, wherein the distance of the one or more wind turbines below the plurality of antennas is in a range of between about 1 meter and about 2 meters.

18. The antenna assembly according to claim 15, wherein the one or more wind turbines are mounted to the lattice antenna tower a distance in a range of between about 10 meters and about 30 meters above a ground level.

19. The antenna assembly according to claim 15, wherein the lattice antenna tower has a triangular profile, and wherein three wind turbines are mounted to the lattice antenna tower and have 120 degrees of separation between each other.

20. The antenna assembly according to claim 15, wherein the lattice antenna tower has a square profile, and wherein four wind turbines are mounted to the lattice antenna tower and have 90 degrees of separation between each other.

* * * * *